US007155319B2

(12) United States Patent
Nangoy et al.

(10) Patent No.: US 7,155,319 B2
(45) Date of Patent: Dec. 26, 2006

(54) CLOSED LOOP CONTROL ON LIQUID DELIVERY SYSTEM ECP SLIM CELL

(75) Inventors: Roy C. Nangoy, Santa Clara, CA (US); Allen L. D'Ambra, Burlingame, CA (US); Yevgeniy Rabinovich, Fremont, CA (US); David Z. Chen, San Jose, CA (US); Tao Li, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 173 days.

(21) Appl. No.: 11/064,747

(22) Filed: Feb. 23, 2005

(65) Prior Publication Data

US 2006/0190099 A1 Aug. 24, 2006

(51) Int. Cl.
G05D 9/00 (2006.01)
G05D 11/00 (2006.01)

(52) U.S. Cl. .............. 700/281; 700/282; 700/283; 700/289; 700/275; 73/1.73; 73/1.74; 73/1.16; 73/1.36; 137/2; 137/7; 137/8; 137/9; 702/45; 702/46; 702/47; 702/55

(58) Field of Classification Search ............ 700/281, 700/282, 283, 289, 275; 73/1.73, 1.74, 1.16, 73/1.36; 137/2, 7, 8, 9; 702/45, 46, 47, 702/55
See application file for complete search history.

(56) References Cited

U.S. PATENT DOCUMENTS

| 3,746,899 A | 7/1973 | Eastham |
| 3,975,668 A | 8/1976 | Davie |
| 4,037,126 A | 7/1977 | Brennan et al. |
| 4,052,783 A | 10/1977 | Shively |
| 4,450,708 A | 5/1984 | King |
| 4,739,643 A | 4/1988 | Kuriyama et al. |
| 4,833,356 A | 5/1989 | Bansal et al. |
| 5,258,796 A | 11/1993 | Patterson |
| 5,368,715 A | 11/1994 | Hurley et al. |
| 5,714,824 A | 2/1998 | Couture et al. |
| 5,858,196 A | 1/1999 | Ikenaga |
| 5,926,940 A | 7/1999 | Toh et al. |
| 5,955,810 A | 9/1999 | Umeda et al. |
| 5,994,813 A | 11/1999 | Umeda et al. |
| 6,049,154 A | 4/2000 | Asao et al. |
| 6,066,196 A * | 5/2000 | Kaloyeros et al. ......... 106/1.18 |
| 6,107,718 A | 8/2000 | Schustek et al. |
| 6,113,769 A | 9/2000 | Uzoh et al. |
| 6,113,771 A | 9/2000 | Landau et al. |
| 6,136,163 A | 10/2000 | Cheung et al. |
| 6,157,109 A | 12/2000 | Schiferl et al. |
| 6,313,556 B1 | 11/2001 | Dombrovski et al. |

(Continued)

FOREIGN PATENT DOCUMENTS

EP   0 952 242   10/1999

(Continued)

Primary Examiner—Ramesh Patel
(74) Attorney, Agent, or Firm—Patterson & Sheridan, LLP

(57) ABSTRACT

A method for controlling liquid delivery in a processing chamber. The method includes generating an analog input (AI) signal proportional to a process variable and calculating an analog output (AO) signal based on a setpoint and a deadband. The setpoint is a target value of the process variable and the deadband is an allowable tolerance around the setpoint that determines when the control logic is activated to control the process variable. The method further includes transmitting the AO signal to a control device and adjusting the process variable proportional to the value of the AO signal.

27 Claims, 7 Drawing Sheets

U.S. PATENT DOCUMENTS

| | | |
|---|---|---|
| 6,313,559 B1 | 11/2001 | Kusase et al. |
| 6,376,961 B1 | 4/2002 | Murakami et al. |
| 6,443,435 B1 * | 9/2002 | Hendrickson ............... 261/128 |
| 6,454,927 B1 | 9/2002 | Stevens et al. |
| 6,501,205 B1 | 12/2002 | Asao et al. |
| 6,517,261 B1 | 2/2003 | Piccinino, Jr. et al. |
| 6,525,443 B1 | 2/2003 | Asao |
| 6,752,547 B1 | 6/2004 | Britcher et al. |
| 6,806,611 B1 | 10/2004 | Bharaj et al. |
| 7,011,299 B1 * | 3/2006 | Curran ..................... 261/66 |
| 7,025,337 B1 * | 4/2006 | Curran ..................... 261/62 |
| 7,112,758 B1 * | 9/2006 | Ma et al. ................ 219/121.47 |
| 2002/0076492 A1 * | 6/2002 | Loan et al. ............ 427/255.28 |
| 2002/0158141 A1 * | 10/2002 | Ryu ........................ 239/102.2 |
| 2003/0101938 A1 * | 6/2003 | Ronsse et al. .............. 118/726 |
| 2005/0173003 A1 * | 8/2005 | Laverdiere et al. ...... 137/487.5 |

FOREIGN PATENT DOCUMENTS

| | | |
|---|---|---|
| JP | 5-216241 | 8/1993 |
| WO | WO 99/54527 | 10/1999 |
| WO | WO 99/54920 | 10/1999 |

* cited by examiner

CLOSED LOOP CONTROL ON LIQUID DELIVERY SYSTEM ECP SLIM CELL

BACKGROUND OF THE INVENTION

1. Field of the Invention

Embodiments of the invention generally relate to the closed loop control of a process variable and more specifically to closed loop control of liquid delivery for wet processing of substrates in the fabrication of electronic devices.

2. Description of the Related Art

Wet processing of substrates in the fabrication of electronic devices, particularly in electrochemical plating (ECP) and chemical/mechanical polish (CMP) applications, often require precisely controlled chemical deliveries for very short process steps.

Typically, when a substrate is treated in a process chamber, a series of treatments will take place sequentially in the same chamber. This series of treatments, or process steps, is generally referred to as a process recipe. Process recipes are application specific and, therefore, vary depending on which electronic device manufacturer is operating the chamber, what device is being fabricated on the substrate, and sometimes which particular film of the device is currently on the surface of the substrate (i.e., metal 1 vs. metal 2, etc.). In the case of the chemical delivery steps in a wet wafer processing chamber, the process steps in a process recipe are often as short as 10–15 seconds. Under these conditions, accurate and repeatable control of liquid chemical delivery is difficult, and failure to provide such control directly affects substrate quality and device yield. Standard control methods for this application include open loop control and closed loop control.

A simple method of controlling liquid delivery with open loop control uses a fixed orifice with constant pressure. This method controls flow with an adjustable, fixed orifice, for example a needle valve, and a pressure regulator, which maintains a constant fluid pressure upstream of the needle valve and therefore maintains a constant flow rate. For a number of reasons such control has proven inadequate for chemical delivery to a wet processing chamber for the processing of a semiconductor substrate. Chronic problems with this method include: drift from setpoint of both the fixed orifice and the pressure regulator, poor repeatability chamber-to-chamber and substrate-to-substrate, cross-talk between chambers (i.e., actual flow rate to one chamber is affected by whether there is flow to other chambers at the same time), difficulty in monitoring flows without introducing additional sensors, and an inability to incorporate alarms when the flow rate is too far from the target setpoint. Additionally, any changes to the liquid delivery system that affect liquid flow cannot be compensated for with open loop control. Examples of changes include: liquid tubing re-routed or kinked, liquid tubing replaced with tubing of different length or inner diameter, liquid delivery nozzles changed, and flow regulator performance altered due to mechanical wear. When such changes occur, re-calibration is required. Therefore, in order to achieve stable and repeatable DI water and chemical flow to process chambers it is necessary to have a closed loop flow control system.

Closed loop control is based on continuously modifying the desired process variable based on the measured value of the process variable and the setpoint for the process variable. This involves measuring the desired process variable with an appropriate sensor, generating a signal proportional to the measurement, sending this signal to a computer, processing the signal in the computer (using a control algorithm that determines what adjustment needs to be made to the process variable in order for the process variable to be closer to the target setpoint value), and outputting a signal to a control device that is proportional to the desired correction. The amount of correction is a function not only of how much the process variable needs to be adjusted, but also other factors: sampling rate, response times of the control device and sensor, and physical factors such as valve sizes and sensor locations. The process variable is then measured again and the process is repeated, typically at a relatively high frequency, for example every 50 milliseconds. Closed loop control allows for stable and repeatable control of a process variable. The state-of-the-art method used for closed loop control is PID (proportional, integral, derivative) control. With the correct tuning of PID control parameters, this algorithm can provide process variable control over a wide range of situations.

In the case of liquid delivery in a wet substrate processing chamber, a typical closed loop control system might consist of an ultrasonic flow meter or vortex flow meter (FM) as a flow sensor, a pneumatically controlled pressure regulator as a flow regulator, a dedicated computer processing the input signal from the FM with a PID algorithm, and a voltage-to-pressure transducer to convert the output signal voltage from the computer to a proportional pneumatic pressure to operate the control device. For situations involving continuous control of the flow over relatively long periods of time, for example minutes or hours, this system can work well. However, for short process recipe steps that require controlling the flow from full off to a given setpoint in a short time, PID control is not very effective. This is because when tuning a PID control loop, there is a direct trade off between quick response time and minimal overshoot past the setpoint.

In the case of liquid chemical delivery for the treatment of semiconductor substrates, it is very important to avoid overshoot of the flow rate setpoint. This is because overshoot can result in splashing of chemical in the process chamber, which can cause serious defects on the surface of the substrate. Also, for some semiconductor applications, the liquid chemicals must be delivered at precise flow rates, otherwise, serious defects can occur.

For a sudden change in setpoint that only lasts a short time, PID control will still be stabilizing the flow (i.e., hunting above and below the new setpoint) during some or the entire process recipe step. This results in chronic and often serious variations in the process each time the recipe is run. Another problem with PID control in some situations is the fact that it is a calculation intensive method for determining how much the process variable needs to be corrected. This is because no matter how close the process variable is to the target setpoint, the PID algorithm will continue to calculate a correcting adjustment. Often this is not important, but if the computer performing these calculations is shared by a large number of sensors and control devices, for example as with the system controller for a wafer processing system, the response time of the entire system can be slowed, dramatically affecting the ability of the wafer processing system to function. Additionally, if the control device in such a control loop is subject to a significant amount of hysteresis, more sophisticated algorithms need to be incorporated into the PID calculation to offset this effect. This makes the control process even more calculation intensive.

Another issue encountered when controlling fluid flow or other process variables is drift. Drift is caused by long-term systemic changes that increasingly affect the control of a process variable and/or the calibration of sensors or control devices. Factors that contribute to the drift of sensors, control devices, and other mechanical components include normal wear and tear, accumulated contamination, and loss of calibration. Drift can be difficult to detect since it generally takes place over a long period of time (weeks or months) and a conventional closed loop control will compensate until it can no longer keep the process variable at setpoint. An example of this is the mass flow controller (MFC) used in semiconductor manufacturing applications, which generally operates as a self-contained PID closed loop controller that supplies process gas at a specific flow rate. Typically, a central system controller will communicate a desired setpoint to the MFC for a particular recipe and the MFC's internal closed loop control will maintain gas flow at that setpoint. If drift of the gas delivery system being controlled occurs over time (for example due to a loaded filter), the MFC will continue to compensate to keep the process variable at setpoint. It will only send an alarm to a central system controller once it is fully open and still cannot control the gas flow to the setpoint. For most semiconductor processes, this is too late to avoid compromising substrate quality/yield. To prevent this, conservative preventive maintenance (PM) schedules are typically followed for semiconductor manufacturing equipment, for example early filter replacement. This leads to greater system downtime and inefficient use of spare parts and labor.

Therefore, there is a need for a method of closed loop control that:
provides the fastest possible response to sudden changes in process variable setpoint while minimizing or eliminating overshoot of the process variable;
allows the early detection of system drift affecting the process variable;
compensates for hysteresis in the control device of the control system; and
performs the above functions with significantly fewer calculations than demanded by the PID method.

SUMMARY OF THE INVENTION

Various embodiments of the invention are directed to a method for controlling liquid delivery in a processing chamber. The method includes generating an analog input (AI) signal proportional to a process variable and calculating an analog output (AO) signal based on a setpoint and a deadband. The setpoint is a target value of the process variable and the deadband is an allowable tolerance around the setpoint that determines when the control logic is activated to control the process variable. The method further includes transmitting the AO signal to a control device and adjusting the process variable proportional to the value of the AO signal.

Various embodiments of the invention are also directed to a method of monitoring drift of a closed loop control system. The method includes generating an analog input signal proportional to a process variable being controlled to a target setpoint; calculating an analog output signal based on the analog input signal and the target setpoint for the process variable; determining a drift has occurred if the analog output signal is one of less than a lower voltage warning or greater than an upper voltage warning; and generating a warning.

Various embodiments of the invention provide improved process control over the prior art in applications where it is critical to have a quick response time, fast stabilization at the setpoint, and minimal overshoot. When a sudden change in setpoint of a process variable occurs, a control device is initially opened or closed to a best guess position based on the position of the control device the last time the setpoint was requested, thereby providing quick response without overshoot. Closed loop control is then used for fine tuning the process variable. The process variable is only corrected when it is measured to be outside an allowable tolerance around the setpoint. This method of closed loop control is particularly useful for situations in which the setpoint of a process variable is suddenly changed (for example an on/off scenario) and the process variable must be controlled to the new setpoint quickly and precisely.

Various embodiments of the invention also provide a method for detecting drift before it begins to affect process control. When excessive correction by a control device is required to maintain a process variable inside an allowable tolerance around a setpoint, an alarm is generated indicating that drift has occurred and control of the process variable may be lost.

Various embodiments of the invention also provide a method for minimizing the effects of hysteresis of the control device on control of the process variable. A multiplier constant is incorporated in the control logic that corrects a process variable at a different rate when ramping up to a setpoint than when ramping down to a setpoint.

Various embodiments of the invention disclose a method of providing closed loop control of a process variable while minimizing the number of calculations required to determine control device adjustment. When an adjustment of the control device is necessary, the control device is incrementally opened or closed a predetermined amount. The control device is not adjusted based on proportional, derivative, or integration calculations of the process variable and its variation from setpoint and no such calculations are performed. In addition, whenever the process variable is within an allowable tolerance around setpoint, the position of the control device is not adjusted and no calculations are required to determine the adjustment of the control device.

In one embodiment, the invention is used for closed loop control of the delivery of liquids or gases at precise flow rates, typically when the required flow is for short periods of time.

In another embodiment, the invention is used to control the flow rate of chemicals or de-ionized water (DI) to a process chamber for wet treatment of a substrate for semiconductor processing. Applications include, but are not limited to, treatment of copper-plated silicon wafers (both pre- and post-plating) and chemical/mechanical polishing of silicon wafers.

In yet another embodiment, the invention is used to control the flow rate of chemicals and DI water to an integrated bevel clean (IBC) chamber for the purpose of removing copper plated on the edge of a silicon wafer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One or more embodiments of the invention are directed to a method of closed loop control in which a process variable being controlled to a setpoint is only adjusted when the process variable's value is outside of a pre-determined deadband above or below the setpoint. Compared to PID control, various embodiments of the invention require only a small number of calculations to control the process variable to the setpoint. In one embodiment, the invention allow the process variable to be controlled to a new setpoint over a short response time without the risk of overshoot or instability. This is accomplished after a sudden change in setpoint by commanding the control device to open to a best guess position for a pre-determined length of time without using closed loop control. The best guess position is the position corresponding to the last time the process variable was controlled to the new setpoint. In another embodiment, the method further compensates for hysteresis of the control device with a single multiplication factor. In yet another embodiment, the method also detects drift of a control system prior to losing control of the process variable.

Figure 1:
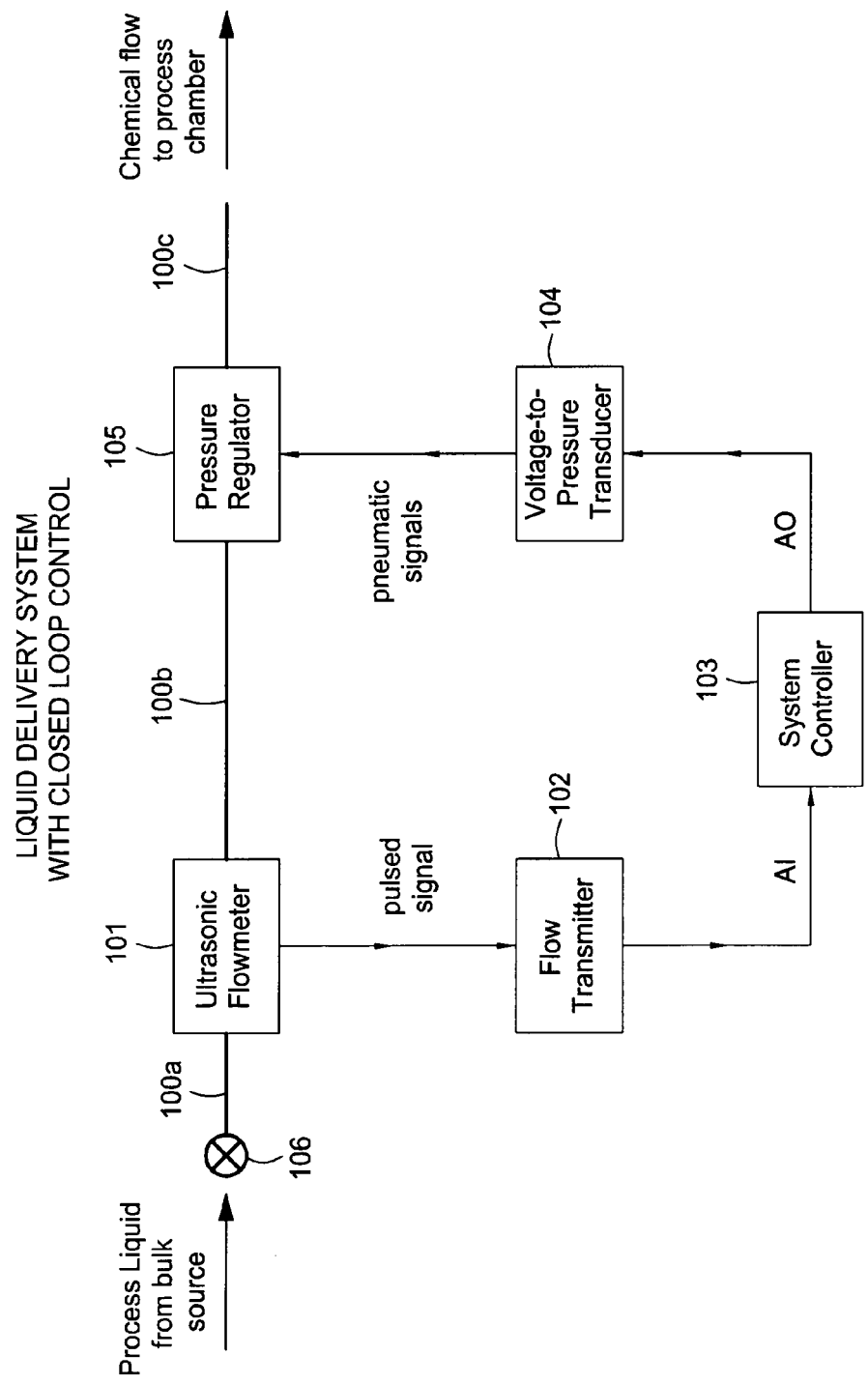
FIG. 1 is a block diagram of a liquid delivery system and associated control components necessary to operate with closed loop control in accordance with one embodiment of the invention.

A typical closed loop control liquid delivery system applying an embodiment of the invention as its control algorithm is depicted in FIG. 1. The closed loop control liquid delivery system includes a liquid delivery line 100a that connects a bulk source of process liquid (not shown) to ultrasonic flow meter 101. In one embodiment, flow meter 101 may be a vortex flowmeter. Liquid delivery line 100a is isolated from the bulk source by shut-off valve 106. Flow meter 101 is connected to pneumatically controlled liquid pressure regulator 105 by liquid delivery line 100b. Liquid delivery line 100c connects regulator 105 to the process chamber. When process liquid flow is requested, shut-off valve 106 opens. The process liquid flows from the bulk source through delivery line 100a, through flow meter 101 (the sensor for this control loop), through delivery line 100b to pressure regulator 105 (the flow controller for this control loop), through delivery line 100c to the process chamber, where the substrate is treated by the liquid. Flow meter 101 measures the flow rate and generates an analog signal proportional to the flow rate of the process liquid. Flow meter 101 then transmits its signal to flow transmitter 102. With the embodiment of closed loop control system used in this example, it is necessary to convert the pulsed signal from flow meter 101 to an analog signal. Other embodiments in which the flow meter generates an analog signal directly can also be used, in which case flow transmitter 102 may not be necessary. Flow transmitter 102 transmits the analog signal, referred to as an analog input (AI), to a system controller 103. Calibration of flow transmitter 102 is typically necessary to condition the signal from flow meter 101 and get a proper AI for system controller 103. System controller 103 calculates what adjustment is necessary to the flow by processing the AI with the method of the invention, based on the AI signal and the specific settings of the invention's tuning parameters. These parameters are detailed below and include: "setpoint", "deadband", "correction", "upcorrection" and "correctscale". The control logic of the invention is detailed below and summarized in the flow chart in FIG. 7. System controller 103 then requests the desired flow adjustment by sending an analog output (AO) to voltage-to-pressure transducer 104. Transducer 104 converts the AO voltage signal into a proportionally scaled air pressure. Based on the pneumatic pressure, liquid pressure regulator 105 either enlarges or reduces the liquid flow path, adjusting the liquid flow rate. The process variable (flow rate in this case) is then measured again and the above process is repeated, typically at a relatively high frequency, for example every 100 milliseconds. Shut-off valve 106 is normally closed and only opens when a process recipe requests flow of the process chemical. System controller 103 regularly tests whether shut-off valve 106 is open or closed, typically every 100 milliseconds.

Figure 2:
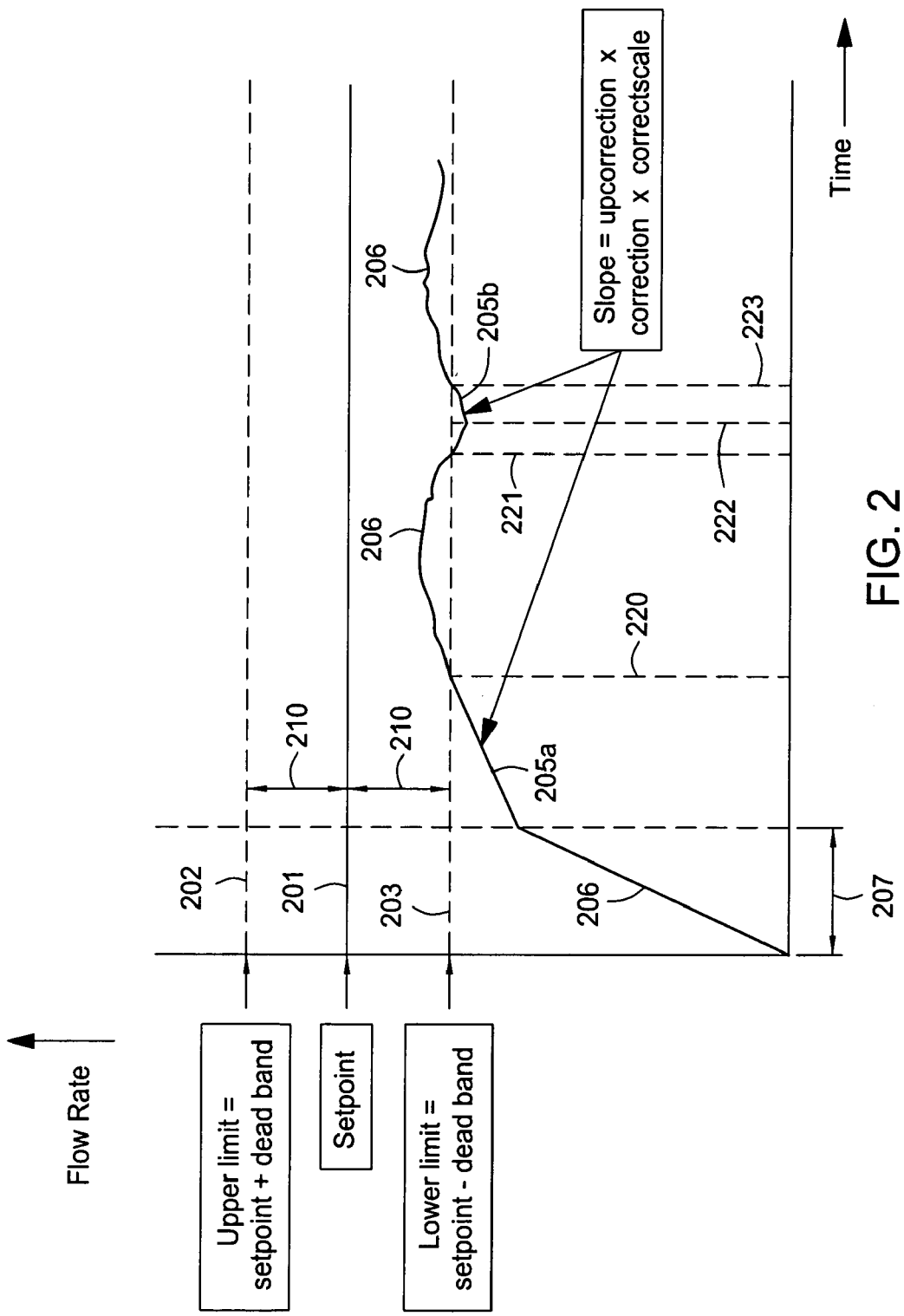
FIG. 2 is a graph plotting flow rate vs. time in a liquid delivery system controlled by one embodiment of the method of the invention.
Figure 7:
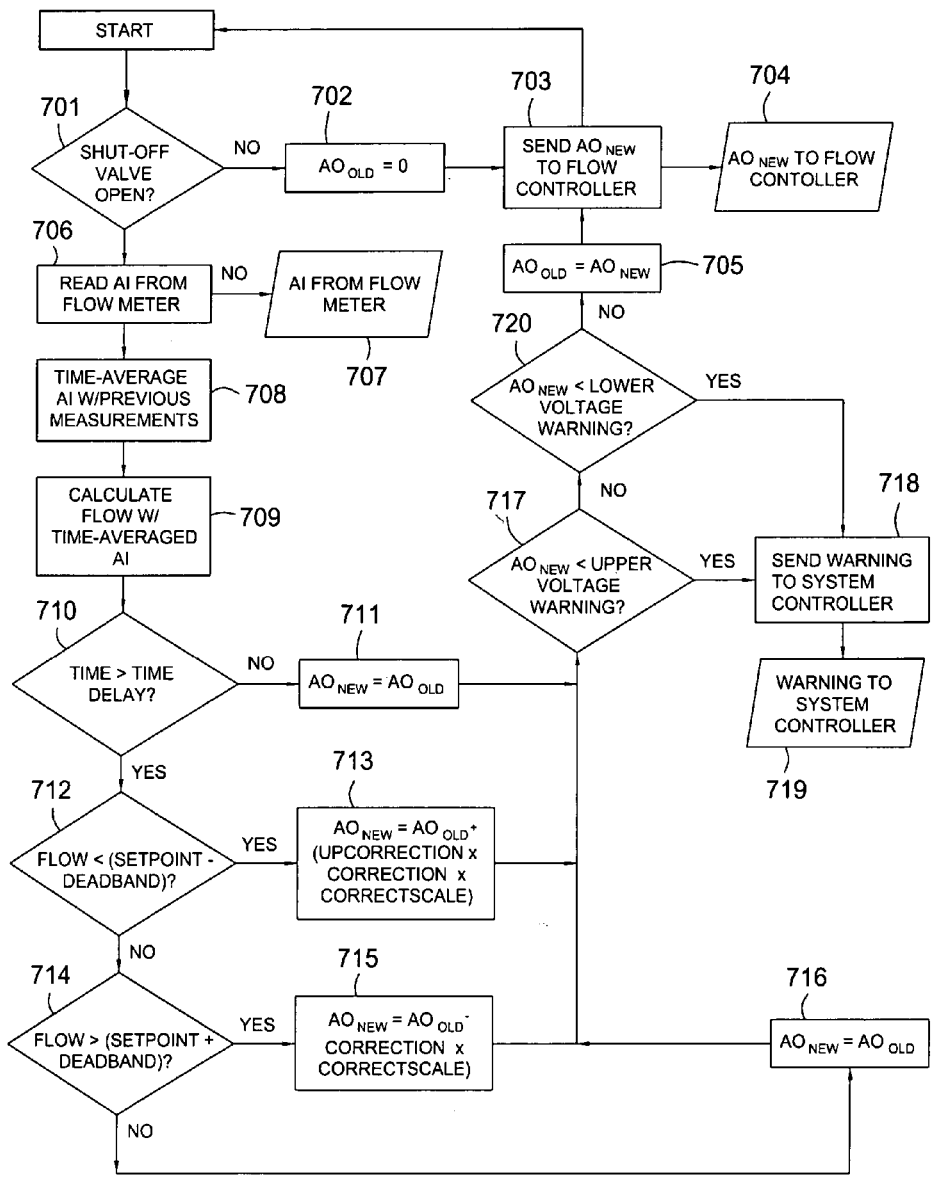
FIG. 7 is a flow chart summarizing the control logic of one embodiment of the invention.

The flow chart in FIG. 7 summarizes the control logic of the invention as applied to the closed loop control liquid delivery system described above and represented schematically in FIG. 1. The control logic of the invention is based on the following definitions:

"$AO_{new}$" is a newly calculated value of an output signal that a computer will send to a control device to correct a process variable closer to a target setpoint. In this embodiment, system controller 103 will send $AO_{new}$ to pressure regulator 105 via transducer 104 to adjust flow rate 206 (FIG. 2) closer to setpoint 201 (FIG. 2).

"$AO_{old}$" is the most recent value of the AO sent by the computer to the control device when the process variable was controlled to the current setpoint. In this embodiment, $AO_{old}$ is the most recent value of the AO sent by system controller 103 to pressure regulator 105 via transducer 104 when shut-off valve 106 was open.

"Time" is the time elapsed since the process variable has been controlled to the current setpoint. In this embodiment, "time" is the time elapsed since chemical flow has been requested, i.e., the time elapsed since shut-off valve 106 has been detected as open.

"Time delay" is the period of time during which closed loop control is not used to control the process variable and instead the control device is set at a fixed position for the duration of "time delay". This period begins when the process variable has received a new set point. In this embodiment, "time delay" begins whenever chemical flow is requested by system controller 103 for a process recipe step.

"Flow" is the value of the process variable based on the latest AI value received by the computer, time averaged with a number of the most recently calculated values of AI, and converted to the appropriate units. In this embodiment, "flow" is the flow rate 206 of process chemical. Time averaging is used to prevent the control loop from adjusting flow meter 101 due to small, random fluctuations—or "jitter"—in the output of the flow meter. The number of previous values of AI used in the time averaging calculation is a function of the sampling frequency of flow meter 101 and the length of time selected for time averaging. For example, when a 0.5 second period for time averaging is used with a flow meter that measures flow rate every 50 milliseconds, the new value of "flow" will be based on an AI value averaged over a total of ten measurements (the newest measurement along with the previous nine) to determine the next value of "flow" used in the control logic.

"Setpoint" is the target value of the process variable, in this case process chemical flow rate.

"Deadband" is the allowable tolerance around the setpoint that determines when closed loop control logic is activated to control the process variable. The magnitude of "deadband" varies with application. Processes that are more sensitive to variations in the process variable will need a smaller value for "deadband".

"Correction" is a speed constant multiplier that together with "correctscale" controls the rate at which the process variable (flow rate in this example) is adjusted to within deadband of setpoint. This is a coarse scale closed loop tuning parameter.

"Upcorrection" is a multiplier constant that allows adjusting the process variable (flow rate in this embodiment) at a different rate when ramping up to "setpoint" than when ramping down to "setpoint'. Using "upcorrection" minimizes the effects of hysteresis in a control device, such as a flow controller that responds differently to an AO when opening than when closing.

"Correctscale" is a restriction coefficient that is adjusted for a specific combination of setpoint and other physical factors that affect response of the process variable, such as tube size or length, response time of measuring device, response time of control device and sampling rate of the process variable. This is a dimensionless quantity (1 to 100) used as a fine scale closed loop tuning parameter. Together with "correction", this controls the rate at which the process variable (flow rate in this example) is adjusted to within "deadband" of "setpoint".

"Lower voltage warning" and "upper voltage warning" are voltage values that are outside the typical operating range of a control device (in this embodiment pressure regulator 105) but still correspond to less than either fully open or fully closed for the device. These are not to be confused with upper limit 202 and lower limit 203 for the process variable set point. When "lower voltage warning" or "upper voltage warning" is exceeded, there is excessive correction required by the control device (pressure regulator 105 in this embodiment) to compensate for drift somewhere in the system—i.e., a clogged filter, kinked chemical delivery line, leaking fitting, etc.

Referring now to FIG. 7, at block 701, system controller 103 polls the condition of shut-off valve 106. This step occurs periodically throughout the operation of the closed loop control system, e.g., once every 100 milliseconds. If shut-off valve 106 is closed, no chemical flow is required to the process chamber and $AO_{new}$ is set to zero (block 702). In block 703, $AO_{new}$ is sent to pressure regulator 105. In this embodiment, AO=0 corresponds to the full closed position for pressure regulator 105. Block 704 represents the output signal to pressure regulator 105. After 100 milliseconds, system controller 103 again polls the condition of shut-off valve 106. If shut-off valve 106 is open, the logic sequence continues to FIG. 7, block 706. In other embodiments, the polling in block 701 can be based on a different criterion than the condition of shut-off valve 106, for example a sensor reading, a signal indicating the beginning of a recipe step, etc.

At block 706, system controller 103 reads the AI from flow meter 101. Flow meter 101 continually measures chemical flow rate and sends the latest measurement as an AI to system controller 103 periodically—in this embodiment every 100 milliseconds (block 707). System controller 103 time averages the current AI value (block 708) and calculates the current value for "flow" (block 709). In other embodiments, the value for "flow" can be time averaged over previous values instead of AI.

After "flow" is calculated, system controller 103 then checks to see if "time delay" has expired, i.e., is "time">"time delay"? (block 710). If "time delay" has not expired, then $AO_{new}$ is set to the value of $AO_{old}$ (block 711). The new value of $AO_{new}$ is tested against the upper and lower voltage warning levels (blocks 717 and 720, respectively), $AO_{old}$ is updated to the latest value of $AO_{new}$ (block 705), and the output signal $AO_{new}$ is sent to pressure regulator 105 (block 703). This loop will continue until "time delay" has expired.

At block 710, when "time delay" expires, closed loop control of the process variable begins and the value for $AO_{new}$ is determined by system controller 103 using the following logic:

If (setpoint−deadband)<flow<(setpoint+deadband), then $AO_{new}=AO_{old}$, i.e., "flow" is within the deadband and no adjustment to pressure regulator 105 is necessary.

If flow>(setpoint+deadband), then $AO_{new}=AO_{old}-$(correction×correctscale), i.e., "flow" is above the deadband and pressure regulator 105 must be adjusted to correct "flow" downward.

If flow<(setpoint−deadband), then $AO_{new}=AO_{old}+$(upcorrection×correction×correctscale), i.e., "flow" is below the deadband and pressure regulator 105 must be adjusted to correct "flow" upward.

After the new value for $AO_{new}$ has been calculated (in block 713, 715, or 716), $AO_{new}$ is tested against the upper and lower voltage warning levels (blocks 717 and 720). If $AO_{new}$<"lower voltage warning", or if $AO_{new}$>"upper voltage warning", then system controller 103 generates a warning indicating that the process variable is nearing the point where it can no longer be controlled (blocks 718 and 719). In other embodiments, system controller 103 generates a unique warning for "lower voltage warning" and for "upper voltage warning".

Referring to block 705, $AO_{old}$ is reset to the value of $AO_{new}$, and $AO_{new}$ is sent to pressure regulator 105. System controller 103 polls the condition of shut-off valve 106 again (block 701) after the required 100 millisecond interval has elapsed, and closed loop control continues.

FIG. 2 illustrates the behavior of one embodiment of a closed loop control system utilizing the invention for the control algorithm. FIG. 2 is a graph plotting a process variable (in this case flow rate 206 of a liquid) being controlled by the closed loop control delivery system described above and depicted schematically in FIG. 1. The abscissa represents time and the ordinate represents flow rate. In one step of a process recipe, flow rate 206 of a process chemical is requested to change from full off to the new setpoint 201. This is shown in FIG. 2 at time=0. Flow rate 206 begins at full off (i.e. no flow) but is requested to reach target setpoint 201 as quickly as possible. This represents the instant that flow is first being requested at the beginning of the process recipe step.

If shut-off valve 106 is closed, system controller 103 sets the AO for the flow controller equal to 0 (full closed) and sends this command to the flow controller.

When flow is requested, shut-off valve 106 is opened and process chemical is delivered to the process chamber at a flow rate determined by pressure regulator 105. When shut-off valve 106 is opened, closed loop control is not used for a period of time equal to time delay 207. Instead, pressure regulator 105 is commanded to open to a set value for this time period and is not controlled by the system controller 103 to adjust flow closer to setpoint 201.

Time delay 207 is used because sampling rates of flow meter 101 can be much shorter than the physical response time of the flow control device (for example 100 milliseconds sampling time vs. 1 or 2 seconds control device response time). Therefore, when pressure regulator 105 is commanded to open very quickly, flow meter 101 could make a flow measurement before pressure regulator 105 has had enough time to respond to the control signal (the AO). If this happens, system controller 103 would request pressure regulator 105 to remain full open too long because of the time lag in the response of pressure regulator 105. This type of over-responsiveness of the control loop leads to overshoot past setpoint 201 whenever a large change in setpoint occurs.

Figure 3:
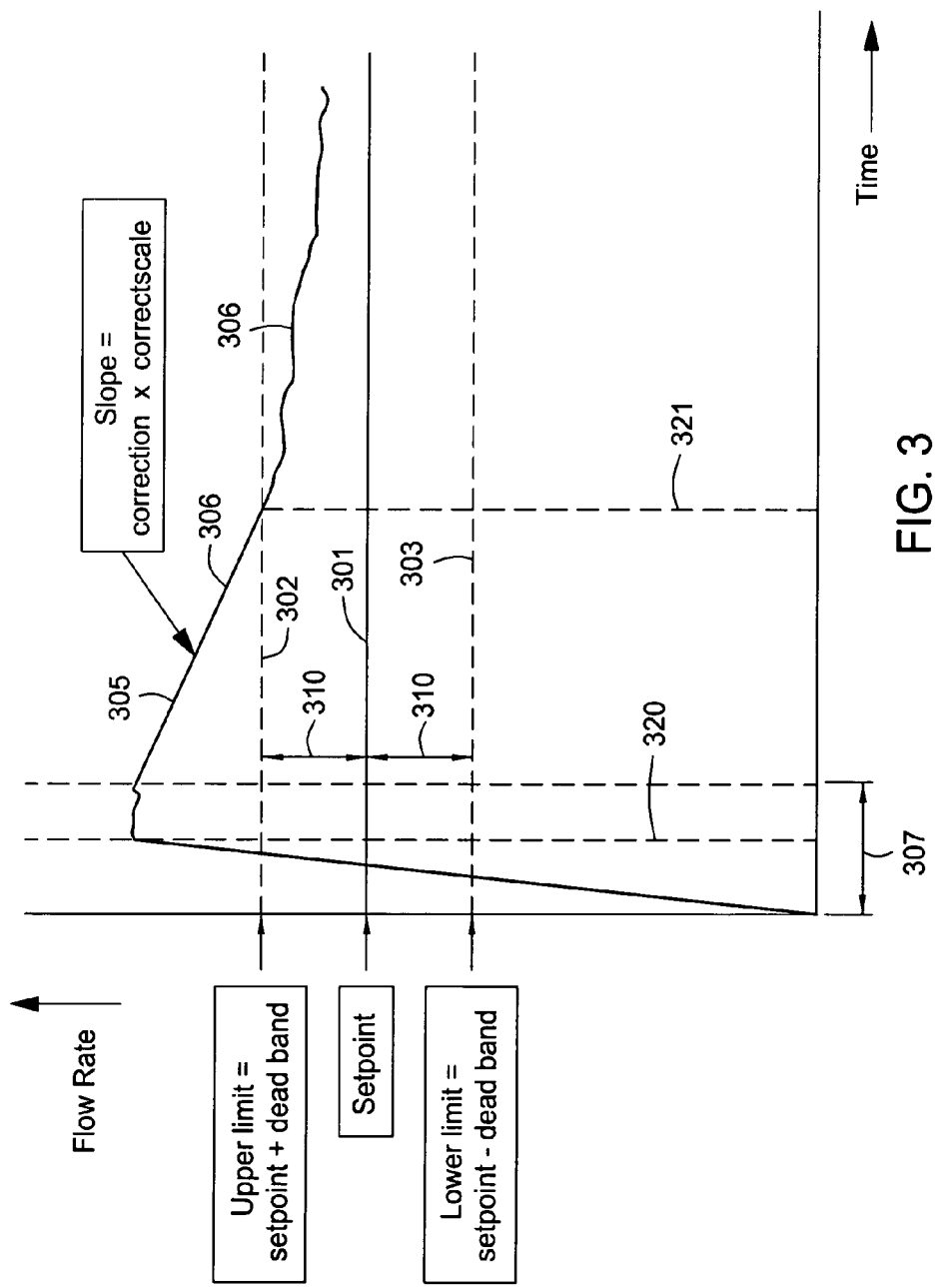
FIG. 3 is a graph plotting flow rate vs. time in a liquid delivery system controlled by another embodiment of the method of the invention.

Because there is no closed loop control during time delay 207, the setting for pressure regulator 105 during time delay 207 is critical. This initial setting for pressure regulator 105 ($AO_{old}$) must result in flow as close as possible to setpoint 201 without the input of closed loop control. This is accomplished by setting $AO_{old}$ equal to the last AO sent by system controller 103 to pressure regulator 105. This "feed-forward" method of starting a process recipe step with the most recent AO value from the previous process recipe step allows pressure regulator 105 to adjust the flow as quickly as mechanically possible to a new setpoint value without the instabilities inherent in PID control. With the method of the invention, an appropriate value for time delay 207 can be selected for each situation that will minimize the potential for overshoot and begin closed loop control for fine-tuning the flow rate to the setpoint. The length of the time delay is based on the physical characteristics of the flow controller being used. Time delay 207 can be increased in length if overshoot is observed and decreased if closed loop control begins too early. FIG. 2 depicts a scenario in which time delay 207 is slightly too short. A longer time delay 207 allows pressure regulator 105 to open as quickly as possible to a setting closer to setpoint 201. FIG. 3 depicts a scenario in which time delay 307 is longer than necessary. FIG. 3 also shows an example of overshoot. In this case, a shorter time delay 307 minimizes overshoot and shortens the time required to bring flow rate 306 below upper limit 302.

After time delay 207 has expired, system controller 103 then calculates the new AO for adjusting pressure regulator 105. Based on the latest value of flow rate 206 and setpoint 201, the new AO is determined using the control logic outlined in System controller 103 then requests the desired flow adjustment by sending signal $AO_{new}$ to voltage-to-pressure transducer 104 and flow rate 206 is adjusted by system controller 103 as described in previous paragraphs in connection with FIG. 1. $AO_{old}$ is then reset to the value of $AO_{new}$ in system controller 103 (FIG. 7, block 705), flow rate 206 is measured again by flow meter 101 and the above process is repeated, typically at a relatively high frequency, for example every 100 milliseconds.

Whenever flow rate 206 is within deadband 210 of setpoint 201, no calculations are required to determine $AO_{new}$. When flow rate 206 is outside deadband 210 of setpoint 201, the number of calculations required to determine $AO_{new}$ is very low (i.e., a single addition or subtraction) compared to a typical PID calculation. This minimizes interference with the sampling time of system controller 103 due to large numbers of calculations being performed for many sensors and controllers simultaneously.

FIG. 2 illustrates one example of liquid flow rate vs. time controlled with the method of the invention. At time=0, flow rate 206 is also zero but the requested flow rate is setpoint 201. Until time delay 207 expires, pressure regulator 105 is not adjusted by system controller 103 and instead is commanded to open as quickly as possible to the position corresponding to $AO_{old}$, the last command given by system controller 103 in the previous process recipe. In the example shown in FIG. 2, pressure regulator 105 does not reach this position before time delay 207 expires. Preferably, this would not happen and a value for time delay 207 would be selected that allows pressure regulator 105 to open fully to the position requested by system controller 103 before closed loop control has begun. When time delay 207 expires, closed loop control is initiated using the method of the invention and flow rate 206 is adjusted as described above. In the example shown, flow rate 206 is still below lower limit 203 when closed loop control begins, and so is increased to within deadband 210 of setpoint 201 at a rate of slope 205a. Slope 205a is a function of the logic parameters "upcorrection", "correction", and "correctscale", as defined above. These parameters are used to adjust ramp rate (slope 205a) and overshoot/undershoot when stabilizing flow rate 206 at the beginning of a recipe step. At time 220, flow rate 206 crosses over lower limit 203 and system controller 103 no longer adjusts the setting of pressure regulator 105. Between time 220 and time 221, the position of pressure regulator 105 is held constant and flow rate 206 varies slightly—for example due to small, random fluctuations in liquid delivery system, etc. Flow rate 206 is not adjusted by the closed loop control system as long as it is within deadband 210 of setpoint 201. At time 221, flow rate 206 drops below lower limit 203 and closed loop control is initiated again. At time 222, closed loop control begins to affect flow rate 206 and it again increases at a rate equal to slope 205b until it crosses lower limit 203 at time 223. After time 223, closed loop control is again frozen and flow rate 206 is free to fluctuate between lower limit 203 and upper limit 202. The logic parameter "upcorrection" is used to differentiate slopes 205a & b (the upward correction rate of flow rate 206) and slope 305 (the downward correction rate of flow rate 306). This can be used to compensate for hysteresis in a flow control device without introducing a calculation-intensive algorithm. For example, FIG. 2 depicts a scenario in which flow rate 206 is being corrected upward by pressure regulator 105 and FIG. 3 depicts a scenario in which flow rate 306 is being corrected downward by pressure regulator 105. If pressure regulator 105 is subject to significant hysteresis, it will have a different response to the same value of AO from system controller 103 depending on whether it is opening or closing. The logic parameter "upcorrection" allows for a different adjustment rate to be used for each situation, compensating for the hysteresis effect.

FIG. 3 illustrates another example of liquid flow rate vs. time controlled with the method of the invention. As in the example depicted in FIG. 2, at time=0, flow rate 306 is also zero. Until time delay 307 expires, pressure regulator 105 is requested to open to a set position by system controller 103. System controller 103 does this by sending a signal equal to $AO_{old}$, until time delay 307 expires. In this case pressure regulator 105 opens to the requested position at time 320, before time delay 307 is over. For the time interval between 320 and the end of time delay 307, pressure regulator 105 is not adjusted and flow rate 306 is no longer adjusted until closed loop control begins adjusting it. Until that time, flow rate 306 is free to vary slightly. After time delay 307 expires, closed loop control is initiated and in this case flow rate 306 is adjusted downward since it is above upper limit 302. The rate at which flow rate 306 is corrected toward setpoint 301 is equal to slope 305, which is a function of the logic parameters "correction" and "correctscale". At time 321, flow rate 306 crosses under upper limit 302 and system controller 103 no longer adjusts the setting of pressure regulator 105. The position of pressure regulator 105 is held constant and flow rate 306 is allowed to vary randomly as long as it remains between upper limit 302 and lower limit 303. Whenever the value of flow rate 306 is farther from setpoint 301 than deadband 310, closed loop control will again begin adjusting flow.

In a preferred embodiment of the invention, the invention is employed for closed loop control of chemical delivery for treatment of a substrate for semiconductor processing. In this embodiment, the substrate is a copper plated silicon wafer. The treatment is the removal of plated copper at the edge (or bevel) of the front side of the wafer and the elimination of copper sulfate and any other copper-based contamination from the back side of the edge of the wafer. The treatment typically takes place in a process chamber that is positioned on a processing platform and typically is performed immediately after the wafer has been plated. This is sometimes referred to as an IBC (integrated bevel clean) chamber. The treatment is usually defined by a process recipe that comprises all the necessary process steps for performing the treatment completely and repeatably. A typical process recipe for such a treatment comprises the following steps:

Pre-Rinse: Removes residual electrolyte from the top and bottom of the wafer.
Dry: Removes the majority of liquid from the surface of the wafer.
Edge Etch: Removes copper from the edge of the wafer.
Top Rinse: Removes residual top side chemical from edge of wafer.
Back Side Etch: Removes residual copper contamination from the back side of the wafer.
Full Rinse: Removes any residual process chemicals from the top and back sides of the wafer.
Final Dry: Removes all moisture from the wafer.

Figure 4A:
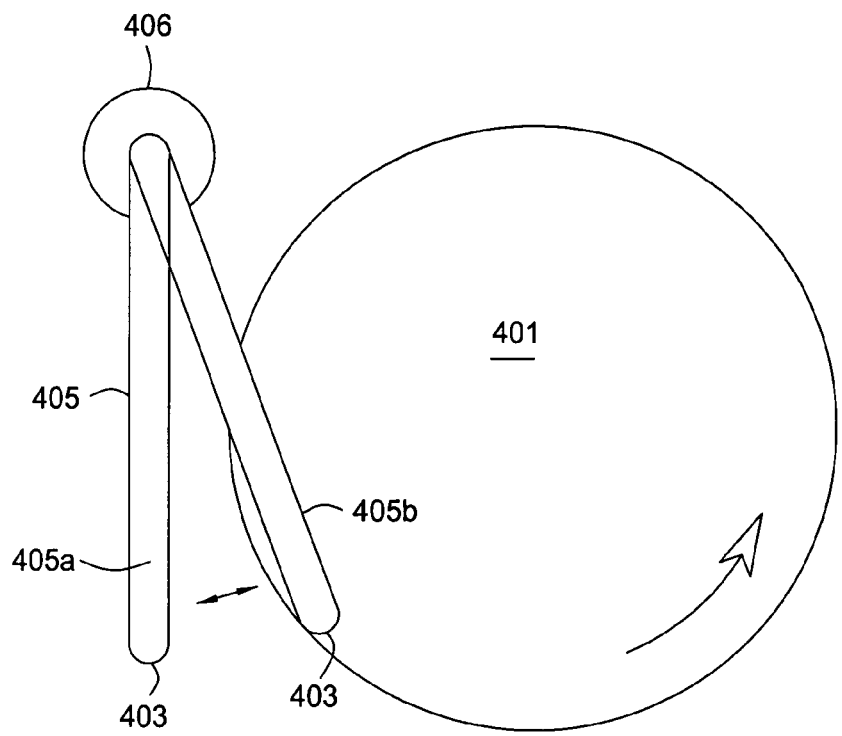
FIG. 4a comprises a plan view of a substrate in an IBC chamber.
Figure 4B:
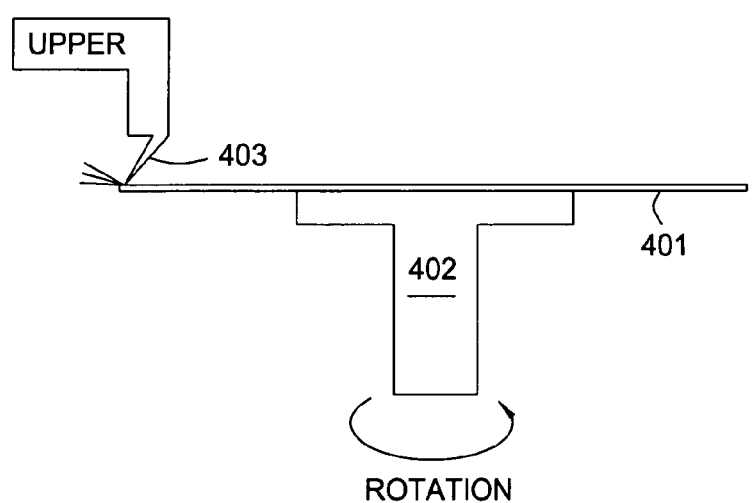
FIG. 4b comprises an elevation view of a substrate in an IBC chamber.

FIG. 4a is a plan view and FIG. 4b is an elevation view of a wafer 401 and a sweep arm mechanism 406 in an IBC chamber. Chemical nozzle arm 405 is attached to sweep arm mechanism 406. FIG. 4a depicts chemical nozzle arm 405 in two positions: 405a, the parked position; and 405b, the process position. Treatment of the wafer takes place with nozzle arm 405 in process position 405b. The front side chemical nozzle 403 is located at the end of sweep arm 406. The back side chemical is applied with a plurality of nozzles that are located beneath the plane of the wafer and are typically embedded in the bottom or sidewalls of the IBC chamber. The front side DI water can be applied by either nozzles embedded in the sidewalls of the IBC chamber above the plane of the wafer or with another sweep arm mechanism, nozzle arm, and nozzle assembly similar to 406, 405, and 403 respectively.

After being plated with copper in a plating cell that is also positioned on the processing platform, wafer 401 is transported by a centrally located transfer robot to the IBC chamber for treatment. Wafer 401 is placed on vacuum chuck 402 by the transfer robot and chucked by vacuum chuck 402 for the pre-rinse step. Wafer 401 is rotated on vacuum chuck 402, preferably between about 100 and about 300 rpm, and rinsed with top side and back side DI water for a short time, typically less than 15 seconds. This removes residual electrolyte that may still be on wafer 401 from the plating process. After the rinse step, wafer 401 is rotated on vacuum chuck 402 at a higher rpm, preferably between about 1000 and about 3000 rpm, for the dry step. The dry step is typically between about 5 and about 15 seconds.

The edge etch step then begins. During this step it is critical that the top side chemical flow rate is stable and very close to the desired setpoint whenever process chemical is being applied to the wafer 401. Wafer 401 is rotated at the rpm required by the process recipe, typically between about 800 and about 3000 rpm. Simultaneously, front side chemical flow begins through chemical nozzle 403 as sweep arm mechanism 406 moves nozzle arm 405 into process position 405b at the edge of the wafer. Starting chemical flow before nozzle arm 405 is in the process position 405b allows the chemical flow rate to stabilize to the setpoint called for by the process recipe before chemical nozzle 403 applies the process chemical to the surface of the wafer. If the top side chemical flow rate is too far below setpoint, the copper at the wafer's edge may not be completely removed. This can cause serious copper contamination problems in wafer processing platforms in which the wafer is subsequently treated. If the flow rate is too far above the set point or overshoots the setpoint, splashing may occur or the copper may be removed too far in from the edge of the wafer, either of which can destroy the electronic devices located near the edge of the wafer. If variations occur in the top side chemical flow rate during this step of the process recipe, uneven or incomplete removal of the copper often occurs. The length of time necessary to complete this step in the process recipe is dependent on several factors, including composition of top side chemical, chemical flow rate, and thickness of copper to be removed. This process recipe step typically requires between about 10 and about 60 seconds to complete the removal of copper.

For the top rinse step, top side chemical flow is stopped, top side DI flow is again initiated to remove residual top side chemical, and sweep arm mechanism 406 rotates nozzle arm 405 back to park position 405a. Vacuum chuck 402 slows rotation to between about 100 and about 300 rpm and rinsing of the top side of the wafer continues for between about 1 and about 20 seconds.

For the back side etch step, top side DI water continues to flow and vacuum chuck 402 continues to rotate wafer 401 at the same rpm as in the top rinse step. Back side chemical is applied to the back side of the wafer for between about 5 and about 20 seconds to remove residual copper contamination. During this step, it is important that the back side chemical flow rate does not overshoot the setpoint because any back side chemical that wraps around to the front side of wafer 401 will damage electrical devices that it contacts.

For the full rinse step, top side DI water continues to flow, back side chemical is stopped, and back side DI water flow is initiated. Vacuum chuck 402 rotates wafer 401 between about 100 and about 400 rpm. This process recipe step typically lasts between about 2 and about 20 seconds.

The final dry step removes most or all moisture from the wafer. Front and back side DI water flow is stopped and wafer 401 is rotated between about 500 and about 2000 rpm. This process recipe step typically lasts between about 2 to about 20 seconds.

After treatment is complete in the IBC chamber, wafer 401 is typically transported by the centrally located transfer robot to another process for final rinsing and drying.

Figure 5A:
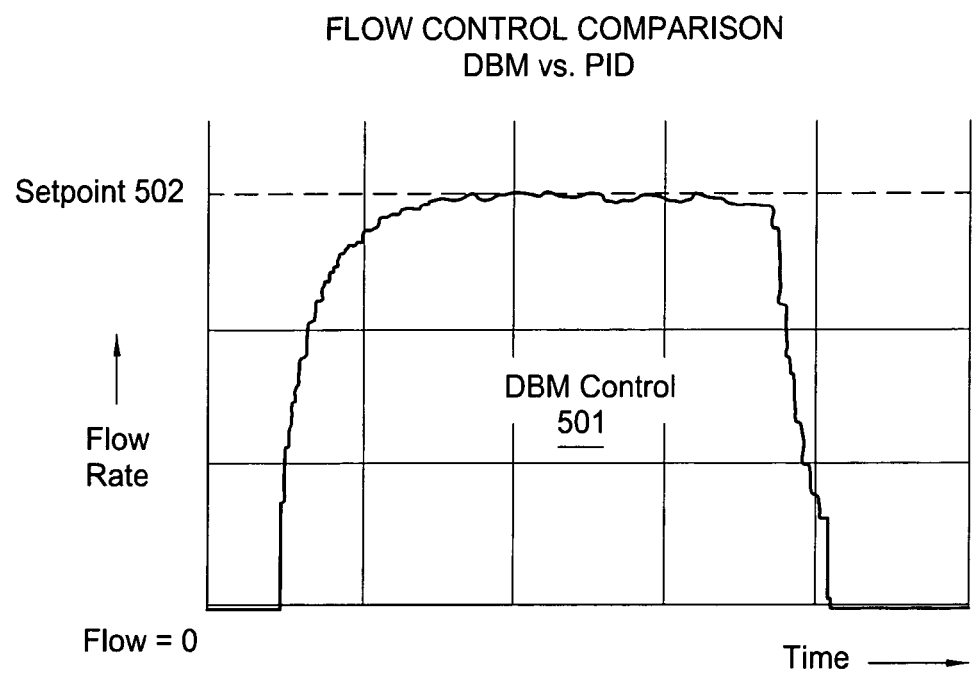
FIG. 5a is a graph plotting DI water flow rate controlled by one embodiment of the method over a single process recipe step.
Figure 5B:
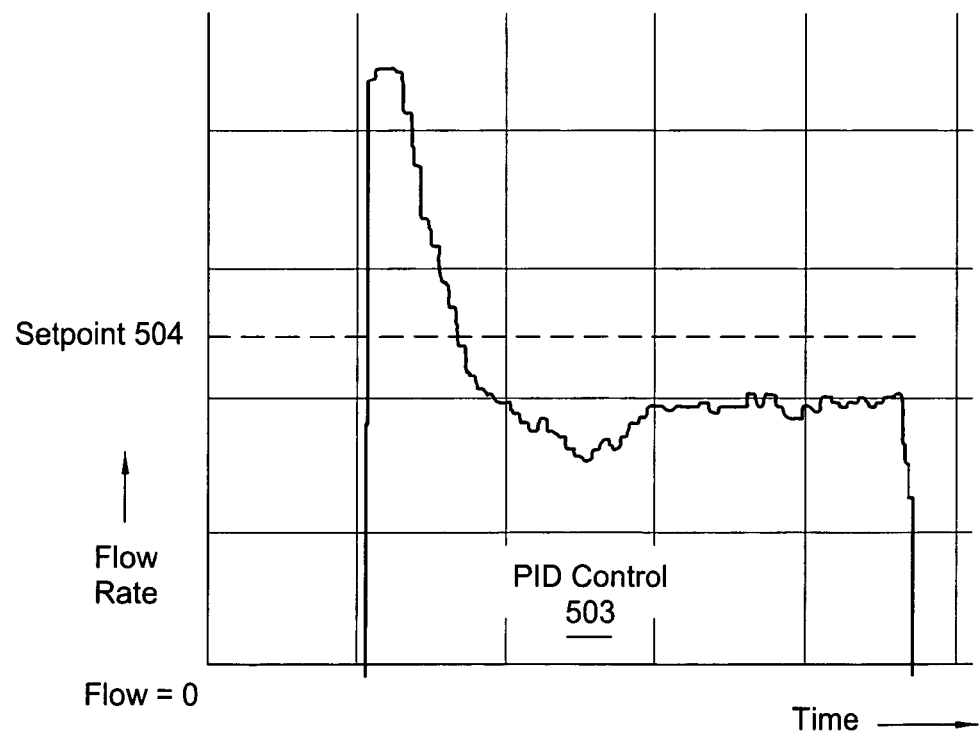
FIG. 5b is a graph plotting DI water flow rate controlled by a PID control algorithm over a single process recipe step.

FIGS. 5a and 5b compare DI water flow rates controlled by the method of the invention and by PID using hardware previously described in connection with FIGS. 4a and 4b. FIGS. 5a and 5b plot flow rate as measured by an ultrasonic flow meter vs. time. The flow rate 501 plotted in FIG. 5a is controlled by the method of the invention and the flow rate 503 plotted in FIG. 5b is controlled by PID closed loop control. In both figures, the abscissa represents time and the ordinate represents flow rate of DI water. In FIG. 5a, the initial flow rate requested is zero flow (full closed). When a process recipe step requires flow of the process liquid (in this case DI water), setpoint 502 is then requested by a system controller and flow rate 501 quickly increases to setpoint 502. In FIG. 5a, setpoint 502 is reached by flow rate 501 without overshooting. Also, after reaching setpoint 502, flow rate 501 stabilizes, i.e., the control system does not continue to hunt for setpoint 502. When the process recipe step is completed, zero flow is requested and flow rate 501 again returns to zero. In FIG. 5b, the initial flow rate requested is also zero and flow rate 503 equals 0. The process recipe then requests a flow rate equal to setpoint 504 and the system controller quickly increases flow rate 503. Tuning the PID control loop to increase flow rapidly, however, leads to overshoot of setpoint 504, followed by undershoot and eventual stabilization—in this case significantly below the required setpoint 504. This is illustrated in FIG. 5b.

Figure 6A:
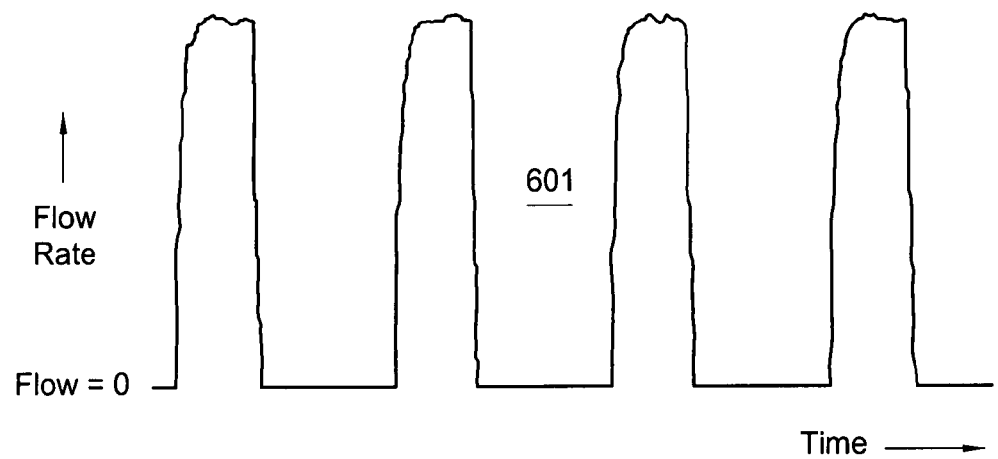
FIG. 6a is a graph plotting DI water flow rate controlled by one embodiment of the method over multiple process recipe steps.
Figure 6B:
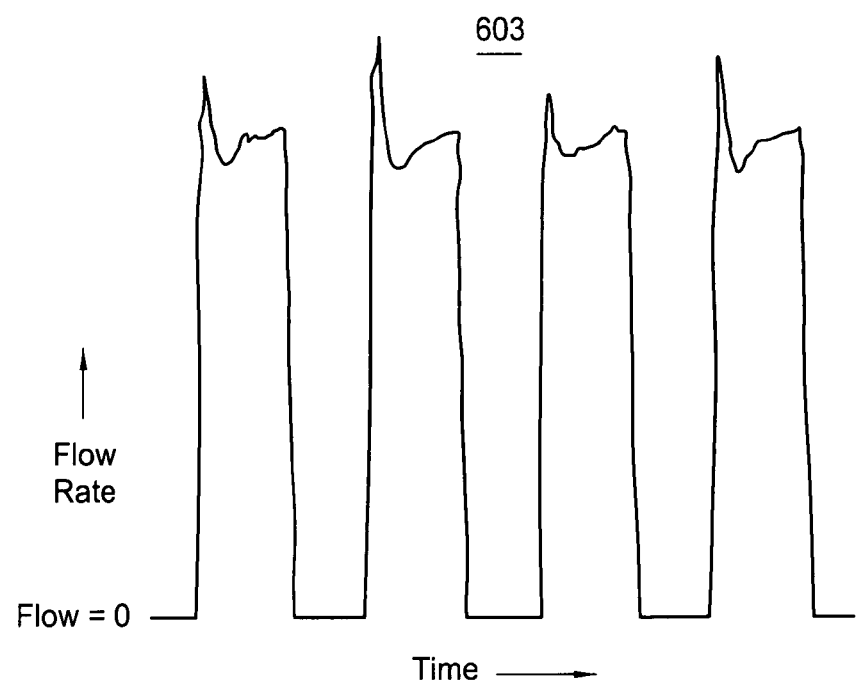
FIG. 6b is a graph plotting DI water flow rate controlled by a PID control algorithm over multiple process recipe steps.

FIGS. 6a and 6b are identical in content to FIGS. 5a and 5b, except that the performance of the invention and of PID control is shown for multiple process recipe steps. FIGS. 6a and 6b plot flow rate as measured by an ultrasonic flow meter vs. time. The flow rate 601 plotted in graph 6a is controlled by the method of the invention and the flow rate 603 plotted in graph 6b is controlled by PID closed loop control. In both figures, the abscissa represents time and the ordinate represents flow rate of DI water. Flow rates 601 and 603 are plotted during multiple process recipe steps, which can represent the same process recipe step performed on a plurality of substrates or multiple applications of the process step on a single substrate. In addition to the overshoot/undershoot problem illustrated in FIG. 5b, FIG. 6b underscores the substrate-to-substrate variation that is likely to occur with PID in this application; there is a significant level of variation in flow rate not only within a single recipe step, but also from one recipe step to another.

While the foregoing is directed to embodiments of the present invention, other and further embodiments of the invention may be devised without departing from the basic scope thereof, and the scope thereof is determined by the claims that follow.

What is claimed is:

1. A method for controlling liquid delivery in a processing chamber, comprising:
   generating an analog input (AI) signal proportional to a process variable;
   calculating an analog output (AO) signal based on a setpoint and a deadband, wherein the setpoint is a target value of the process variable and the deadband is an allowable tolerance around the setpoint that determines when the control logic is activated to control the process variable;
   transmitting the AO signal to a control device; and
   adjusting the process variable proportional to the value of the AO signal.

2. The method of claim 1, wherein the process variable is controlled to the setpoint.

3. The method of claim 1, wherein the process variable is a flow rate of a gas or liquid.

4. The method of claim 1, wherein the process variable is a flow rate of a chemical.

5. The method of claim 1, wherein the AO signal is calculated using a control logic comprising:
   if (setpoint−deadband)<flow<(setpoint+deadband), then AO=$AO_{old}$, wherein flow is the value of the process variable based on the most recent AI signal;
   if flow>(setpoint+deadband), then AO=$AO_{old}$−(correction×correctscale), wherein correction is a multiplier that controls the rate at which the process variable is adjusted to within the deadband and wherein correctscale is a restriction coefficient that controls the rate at which the process variable is adjusted to within the deadband; and
   if flow<(setpoint−deadband), then AO=$AO_{old}$+(correction×correctscale).

6. The method of claim 5, further comprising incorporating a time delay into the control logic to prevent the control device from being adjusted for the duration of the time delay.

7. The method of claim 5, further comprising:
   incorporating a time delay from about 0.0 seconds to about 5.0 seconds into the control logic to prevent the control device from being adjusted for the duration of the time delay; and
   fixing the AO for the duration of the time delay.

8. The method of claim 5, wherein the deadband is between about 0 ml/min and about 50 ml/min.

9. The method of claim 5, wherein the correction is between about 0 ml/min and about 25 ml/min.

10. The method of claim 5, wherein the correctscale is between about 1 and about 100.

11. The method of claim 1, wherein the AI signal is generated with a flow measuring device.

12. The method of claim 11, wherein the flow measuring device is one of an ultra-sonic or a vortex flow meter.

13. The method of claim 1, wherein the process variable is adjusted using the control device.

14. The method of claim 1, wherein the control device is a flow controller.

15. The method of claim 14, wherein the flow controller is a pneumatically controlled pressure regulator.

16. The method of claim 1, further comprising generating a warning whenever the AO signal is less than a lower voltage warning or greater than an upper voltage warning.

17. The method of claim 1, further comprising fixing the AO signal for the duration of the time delay.

18. The method of claim 1, wherein the AO signal is fed forward from the previous time the process variable was controlled to the setpoint.

19. The method of claim 1, further comprising time-averaging the AI signal prior to calculating the AO signal.

20. The method of claim 1, further comprising delivering process chemicals and de-ionized water to a front side and a back side of a copper plated substrate.

21. The method of claim 1, further comprising time averaging the AI signal over a period from about 0.1 seconds to about 10 seconds prior to calculating the AO signal.

22. The method of claim 1, wherein the AO signal is calculated using a control logic comprising:
   if (setpoint−deadband)<flow<(setpoint+deadband), then $AO=AO_{old}$;
   if flow>(setpoint+deadband), then $AO=AO_{old}-$(correction×correctscale); and
   if flow<(setpoint−deadband), then $AO=AO_{old}+$(upcorrection×correction×correctscale), wherein upcorrection is a multiplier constant that controls the rate at which the process variable is adjusted during a ramp up to the setpoint.

23. The method of claim 1, wherein the upcorrection is between about 0.2 and about 2.0.

24. A method of monitoring drift of a closed loop control system, comprising:
   generating an analog input signal proportional to a process variable being controlled to a target setpoint;
   calculating an analog output signal based on the analog input signal and the target setpoint for the process variable;
   determining a drift has occurred if the analog output signal is one of less than a lower voltage warning or greater than an upper voltage warning; and
   generating a warning.

25. The method of claim 24, wherein the process variable is a flow rate of a gas or liquid being controlled to the target setpoint.

26. The method of claim 24, wherein the lower voltage warning is between about 0 volts and about 10 volts.

27. The method of claim 24, wherein the upper voltage warning is between about 0 volts and about 10 volts.

* * * * *